United States Patent [19]

Canup et al.

[11] 4,398,515

[45] Aug. 16, 1983

[54] INTERNAL COMBUSTION ENGINE FUEL CONTROL SYSTEM

[75] Inventors: Robert E. Canup, Poughkeepsie; Edward Mitchell, Hopewell Junction, both of N.Y.; Martin Alperstein, deceased, late of Fishkill, N.Y., by Ellen J. Alperstein, executrix

[73] Assignee: Texaco Inc., White Plains, N.Y.

[21] Appl. No.: 274,855

[22] Filed: Jun. 18, 1981

[51] Int. Cl.³ ............... F02M 59/42; F02M 63/02; F02B 3/00

[52] U.S. Cl. .................. 123/357; 123/367; 123/478

[58] Field of Search ........... 123/450, 458, 510, 446, 123/486, 416, 478, 480, 357, 358, 367

[56] References Cited

U.S. PATENT DOCUMENTS

| | | | |
|---|---|---|---|
| 3,871,344 | 3/1975 | Pigerouhed et al. | 123/367 |
| 3,949,714 | 4/1976 | Mitchell | 123/458 |
| 4,142,493 | 3/1979 | Schira et al. | 123/486 |
| 4,166,437 | 9/1979 | Bianchi et al. | 123/486 |
| 4,167,169 | 9/1979 | White | 123/458 |
| 4,180,037 | 12/1979 | Hobo et al. | 123/357 |
| 4,240,390 | 12/1980 | Takeda | 123/480 |
| 4,290,107 | 9/1981 | Suda et al. | 123/480 |
| 4,309,971 | 1/1982 | Chiesa et al. | 123/486 |
| 4,313,412 | 2/1982 | Hosaka et al. | 123/486 |

Primary Examiner—Raymond A. Nelli
Attorney, Agent, or Firm—Carl G. Ries; Robert A. Kulason; Henry C. Dearborn

[57] ABSTRACT

A fuel control system which is applicable to an internal combustion engine that employs a diesel type fuel injection pump. That type of injection pump incorporates a metering valve to regulate the amount of fuel that is delivered to a pair of pumping plungers. The system includes a microprocessor, and there are means for controlling the metering valve by an output from the microprocessor so that the fuel delivered may be kept at an optimum at all times throughout the operating range of the engine.

3 Claims, 4 Drawing Figures

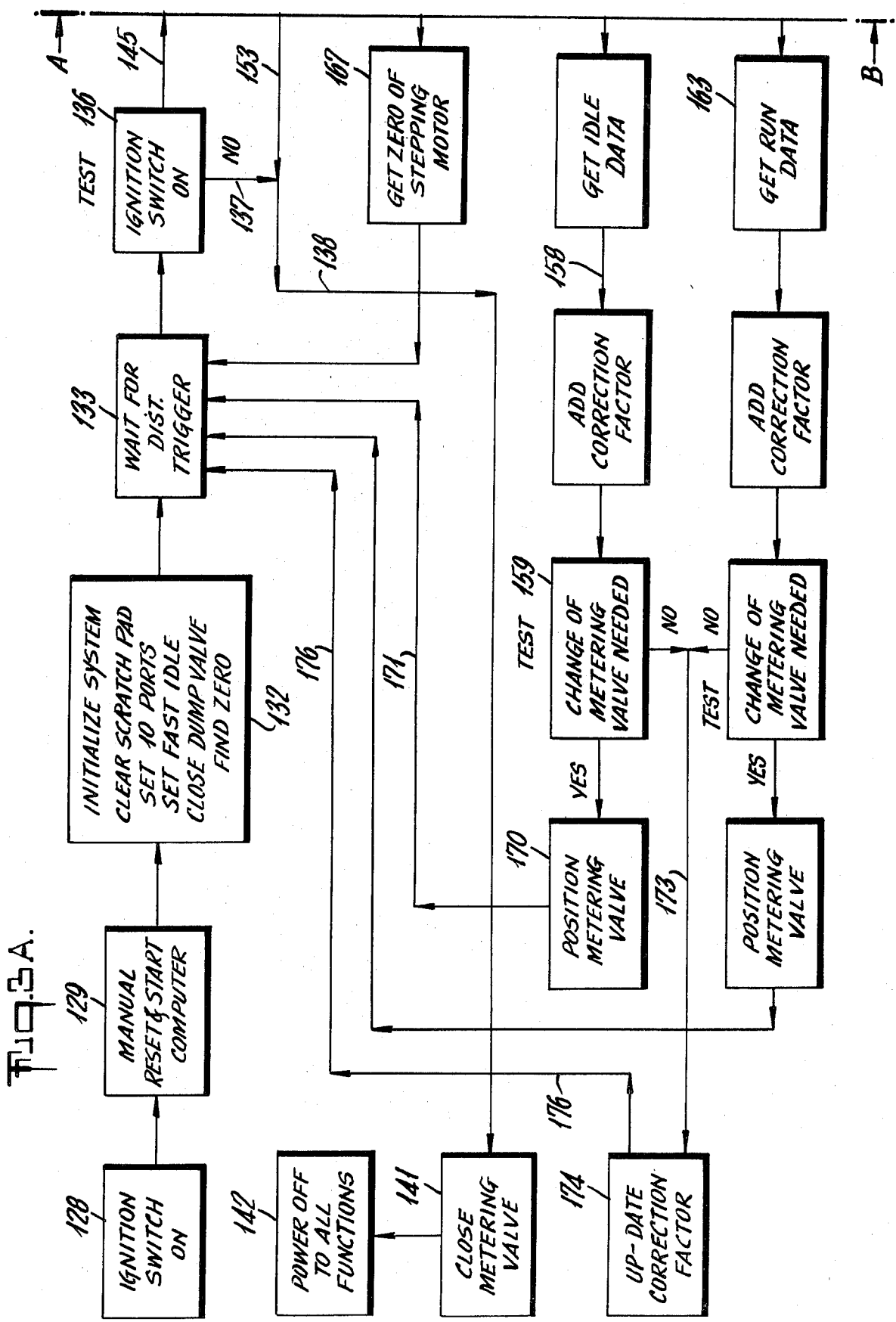

INTERNAL COMBUSTION ENGINE FUEL CONTROL SYSTEM

BACKGROUND OF THE INVENTION

1. Field of the Invention

This invention relates to control systems for internal combustion engines in general. More specifically, it concerns a system for controlling the quantity of fuel supplied to the engine by a diesel type fuel injection pump.

2. Description of the Prior Art

Heretofore, a fuel injection system has been shown and described in U.S. Pat. No. 3,763,833 issued Oct. 9, 1973. However, that system relates to an electromechanical type fuel injector valve which is controllably opened by an electronic control unit to determine the length of time it is open to admit pressurized fuel into a cylinder of an internal combustion engine.

On the other hand, this invention relates to an improvement applicable to a diesel type fuel injector pump that is actuated by direct mechanical coupling with the engine and has a distributor for selecting the cylinder to which each fuel injection is made as the engine operates. The system has a metering valve that controls the quantity of fuel being applied to the high pressure injection pump and injection time at each cylinder is not directly controlled. The action of a diesel type injector pump is such that at each individual pumping action (which is synchronized with the engine cycles by having a cam ring that interacts with rollers to actuate a pair of plungers) there is developed a high pressure pulse of fuel that is sprayed into a given cylinder of the engine.

It is an object of this invention to provide a system with microprocessor for the fuel injection of a diesel type fuel injector pump in an internal combustion engine. Another object is to improve engine operating characteristics by optimum action in the operating fuel quantities under a full range of operating conditions.

SUMMARY OF THE INVENTION

Briefly, the invention concerns a fuel control system for an internal combustion engine which employs a diesel type fuel injection pump having a metering valve. The system comprises a microprocessor, and means for controlling said metering valve by output from said microprocessor to control the delivery rate of fuel to be optimum throughout the operating range of said engine.

Again briefly, the invention concerns a fuel control system for an internal combustion engine employing a diesel type fuel injection pump and having a metering valve. It comprises a microprocessor having a read only memory and means for entering a first series of data representing a curve of engine throttle positions for predetermined speeds covering an operating range. And, it comprises a second series of data representing a curve of throttle positions for speeds covering an idling range. It also comprises adjustable stop means for limiting the opening of said metering valve from zero to maximum, and means for connecting said stop means to an output of said microprocessor. It also comprises speed signal means comprising a pulse generator actuated by said engine, and means for connecting said pulse generator to an output of said microprocessor. It also comprises a random access memory with said microprocessor for temporarily storing data relating to operating parameters of said system, and throttle means, plus means for setting a fast idle state of said throttle means. It also comprises means for connecting said fast idle state means to an output of said microprocessor, and first switch means for determining activation of said throttle. It also comprises means for connecting said first switch means to an input of said microprocessor, and second switch means for sensing zero position of said metering valve. It also comprises means for connecting said second switch means to an input of said microprocessor.

Once more briefly, the invention relates to an internal combustion engine employing a diesel type fuel injection pump wherein said pump comprises a drive shaft coupled to said engine. And, the pump also comprises a pair of pumping plungers coupled to said drive shaft, and a metering valve for controlling the amount of fuel being delivered to said pumping plungers. The pump also comprises throttle means for controlling said metering valve. In the foregoing internal combustion engine with diesel type fuel injection pump, the improvement comprises variable stop means for limiting said metering valve, and a microprocessor for controlling said variable stop means to improve performance of said engine.

Finally, the invention is in relation to an internal combustion engine employing a diesel type fuel injection pump where said pump comprises a drive shaft coupled to said engine, a pair of pumping plungers coupled to said drive shaft, a metering valve for controlling the amount of fuel being delivered to said pumping plungers, and throttle means for controlling said metering valve. In the foregoing combination the improvement comprises incrementally positionable stop means for limiting said metering valve over an operating range, and a microprocessor having a read only memory and a random access memory and means for storing tables of data for both the operating and idle speed ranges of said engine. The improvement also comprises pulse generating means coupled to said engine for providing speed signals therefrom, and means for connecting said speed signals to an input of said microprocessor. It also comprises first switch means for providing a signal when said throttle means is activated, and means for connecting said first switch means to an input of said microprocessor. It also comprises solenoid means for setting a fast idle position into said throttle means, and means for connecting said solenoid means to an output of said microprocessor. It also comprises second switch means for providing a signal when said metering valve is at zero setting, and means for connecting said second switch means to an input of said microprocessor. It also comprises means for connecting said incremental stop means to an output of said microprocessor for controlling the quantity of fuel injection over the entire range of operation of said engine.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIGS. 3A and 3B together make up a block diagram illustrating a flow chart that describes the handling of data by the microprocessor as an internal combustion engine with a system according to the invention is operated.

DESCRIPTION OF THE PREFERRED EMBODIMENT

Internal combustion engines that make use of a diesel type, high pressure injection pump for fuel injection have found inherent problems in matching fuel utilization rate with the direct injection, particularly at low engine speeds. A diesel type pump is capable of supplying a greater quantity of fuel at low engine speed than can be utilized by the engine. And, if the pump is altered so that the maximum which can be delivered is correct at a low speed, then there is insufficient fuel delivered at higher speeds.

The foregoing inherent difficulty causes problems since an operator, wishing to accelerate the engine, or cause it to deliver more power, will invariably open the throttle too far causing an excess fuel to be injected. The excess fuel does not burn completely but instead is exhausted as unburned fuel or black smoke. That result is, of course, undesirable from both an economic and a pollution standpoint.

While there have been controls developed heretofore that are designed to overcome the foregoing excess fuel problem, such devices have been hydraulic or mechanical in nature. And, consequently they have been expensive as well as somewhat limited in their control.

Another difficulty has existed with internal combustion engines employing the diesel type fuel injection pump, in that the fuel injection rate is a function of fuel viscosity. Consequently, lighter fuels such as gasoline will have a greater leakage around the pump plungers during injection than will more viscose type fuel such as diesel fuel oils. However, by employing a system according to the applicants' invention, it becomes feasible to provide control of a diesel type fuel injection pump so as to inject only a sufficient amount of fuel as to be fully utilized by the engine. And, in addition it may provide for making compensation relative to the type of fuel that is being used.

Figure 1:
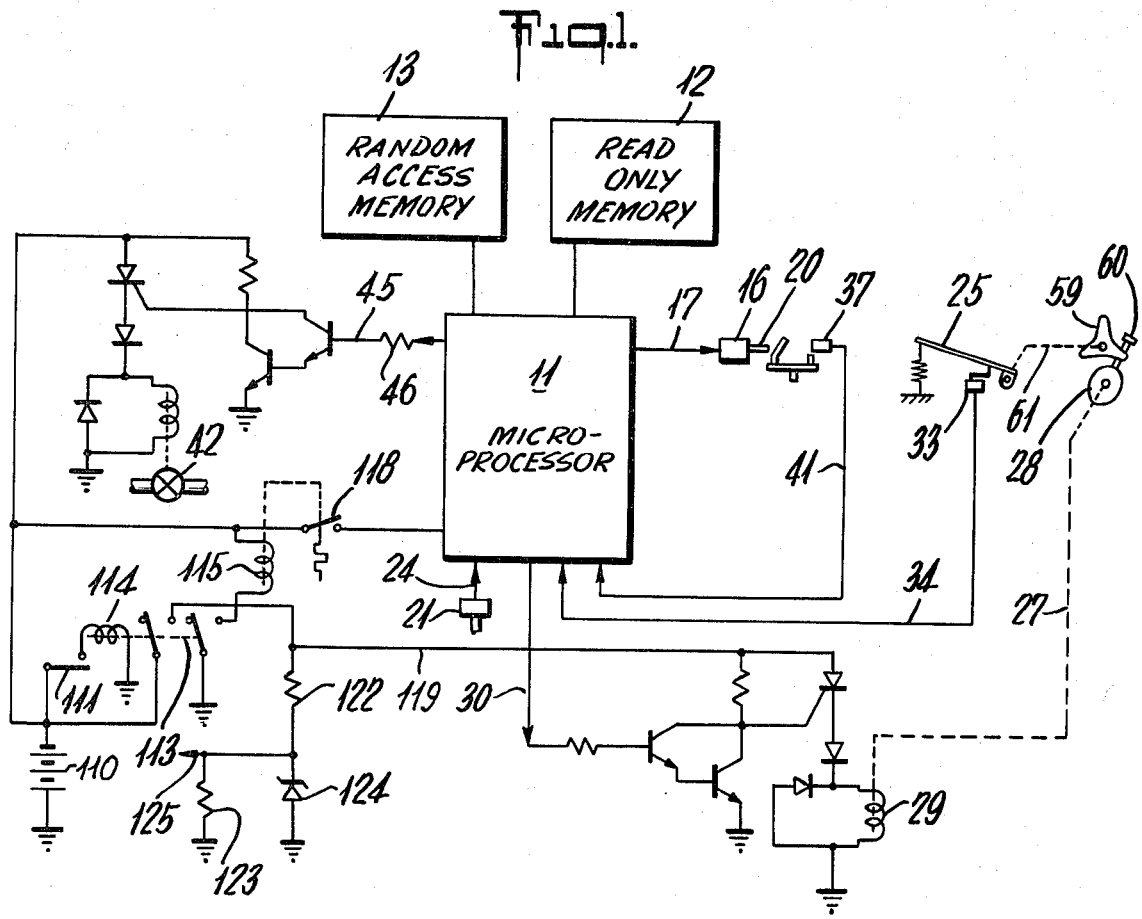
FIG. 1 is a schematic diagram of a system according to the invention, indicating the various elements including those that provide inputs and outputs from a microprocessor.

With reference to FIG. 1, there is a microprocessor element 11 which might take various forms, there being a number of different manufacturers of microprocessors. For example, a microprocessor manufactured by Motorola which is designated as its 6800 model is employed in the illustrated system according to this invention. In conjunction therewith, the system employs a memory unit 12 that may take the form of an Intel type 2716 unit. Such a unit is a 2096×8 bit ultra violet erasable, programmable, read only memory which operates from a low voltage supply. It was found to have more than adequate memory capacity.

There is also a random access memory 13 which may be a separate unit as illustrated, but which may be part of the microprocessor 11 depending on the type microprocessor. It may be noted that the microprocessor 11 employed in the system according to this invention has means for entering predetermined data in the read only memory unit 12. Such data entry is by means of a keyboard (not shown).

It will be understood by one skilled in the art that a system according to the invention, when applied to an engine in a vehicle, would have a required set of data entered by the manufacturer or supplier of the microprocessor. Such entered data would be according to specification in order to fit particular conditions of the engine and fuel to be used, and the like.

The data entered includes a first series of data that represents a curve of the engine's metering valve positions for predetermined speeds. The metering valve positions are controlled indirectly by the engine's throttle, as will be described in more detail hereafter. And, it is the metering valve which controls the quantity of fuel that is delivered by the fuel injection pump.

The speeds relating to that first series of data cover an operating range for the vehicle. In addition, the data entered will include a second series of data representing a curve of metering valve positions for speeds which cover an idling range of the engine's operation.

The system includes an adjustable stop means 16 that acts to limit the opening of the metering valve irrespective of the throttle position, as will be explained with reference to FIG. 2. The adjustable stop is controlled by an output connection 17 from the microprocessor. Stop means 16 may be a linear actuator. And, it may take the form of a small stepping motor that has a plunger 20 which may be positioned stepwise linearly in a reciprocatory manner toward and away from the body of the stop means 16.

The system also includes a speed signal means 21 that could take various forms. It is preferably a pulse generator which is actuated by the engine. Speed measurement is carried out in the microprocessor 11 by making time determinations between pulses from the pulse generator. The pulses are, of course, directly related to the speed of the engine. And, there is an input connection 24 from the pulse generator to the microprocessor 11 where the speed determination is carried out by measuring time between pulses.

The random access memory 13 is part of the total control unit made up of the microprocessor 11 with its memory elements 12 and 13. And, the random access memory 13 acts to temporarily store data relating to various operating parameters of the system. For example, the stop means 16 is actuated under control of the microprocessor 11 via the output connection 17, while the speed signal information is fed into the microprocessor 11 via the connection 24 from the speed signal means 21.

There are throttle means which include a foot throttle lever 25. And, there is a fast idle structure that is schematically indicated. It includes a cam 28 that is positionable by a solenoid 29, as indicated by a dashed line 27. The solenoid 29 is controlled from an output connection 30 which in turn comes from the microprocessor 11. And, a switch 33 is located relative to the throttle lever 25 so as to indicate the activation of the throttle, e.g. whenever an operator's foot is placed thereon. This switch 33 has a connection 34 that is an input to the microprocessor 11.

There is another switch 37 which is located so as to provide a signal at the zero position of the metering valve mentioned above. Such a metering valve 38 is schematically illustrated in FIG. 2. And, there is a circuit connection 41 (FIG. 1) that connects the switch 37 to another input of the microprocessor 11. Another parameter which is controlled by the microprocessor 11 is a fuel dump valve 42. This dump valve 42 is connected to an output connection 45 from the microprocessor 11, and the connection goes via a resistor 46.

Figure 2:
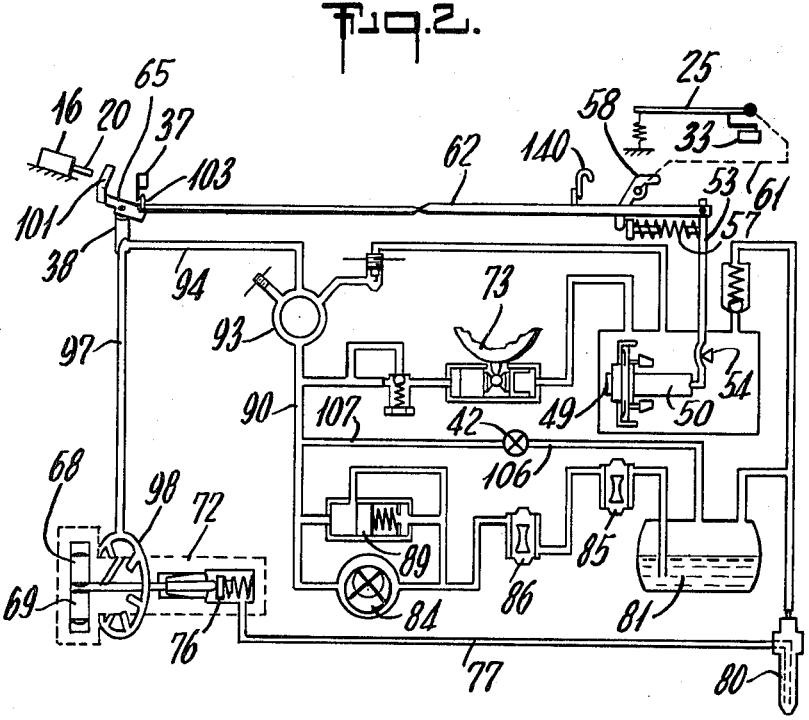
FIG. 2 is a mechanical schematic illustrating a diesel type fuel injection pump and with the addition of some control elements that are employed with the system according to this invention.

FIG. 2 is a mechanical schematic illustrating the elements of a diesel type fuel injection pump. That type fuel injection pump is part of a combination according to this invention. The basic pump is commercially available, and a pump manufactured in the U.S.A. is fully described and explained in detail in an "Operation and Instruction Manual" of a Model DB2 pump that is manufactured by Stanadyne/Hartford Division, Box 1440, Hartford, Conn. 06102, U.S.A.

Relevant elements of a diesel type fuel injection pump are schematically shown in FIG. 2 and will be explained in order to understand its operation. It may be noted that complete and full details of the aforementioned commercial pump are described and set forth in the foregoing instruction manual. For the purposes of this disclosure, the pump includes a drive shaft 49 that is coupled to the engine (not shown), which engine is making use of a fuel control system according to this invention.

The drive shaft 49 has a governor 50 coupled thereto that acts to move a lever arm 53 about a pivot 54. Of course, the force applied to the lever arm 53 depends upon the speed of the drive shaft 49. There is a governor spring 57 which acts in opposition to the force of the governor 50 and at the other end of the lever arm 53. The amount of compression applied to the spring 57 is regulated by an interior rocker 58 that is attached to a throttle shaft 61. Shaft 61 is shown as a dashed line that connects the rocker 58 with the foot throttle lever 25. And, it may be noted that there is an exterior rocker arm 59 (FIG. 1) that is also attached to the shaft 61 and that includes an adjustable cam follower 60 (FIG. 1) which cooperates with the fast idle cam 28 (FIG. 1).

The lever arm 53 is pivotally connected to a connecting arm 62 that is also coupled to the metering valve 38 at a pivot post or stud 103 on a cross arm 65. As will appear more fully hereafter, the regulation of fuel by the metering valve 38 is under control of throttle means which includes the foot throttle lever 25. Such control is via the amount of spring compression applied by the governor spring 57, since the speed of the drive shaft 49 determines how much force is applied at the other end of the lever 53 and about the pivot 54. Thus, as the engine speeds up and consequently drive shaft 49 increases in its speed, the governor tends to move the lever 53 so as to close the metering valve 38, while in opposition thereto the throttle (via shaft 61) acts to apply pressure to the spring 57 and thus balances the tendency for the engine to reduce the amount of fuel being admitted via the metering valve 38.

A diesel type of fuel injection pump, such as that being described here, employs a pair of pumping plungers 68 and 69 that are actuated simultaneously with radial movement toward one another. Such action is accomplished by the rotation of a distributor rotor 72 that acts within a cam ring 73. Only the bottom of the cam ring is illustrated in the schematic showing of FIG. 2. When the pumping plungers 68 and 69 are actuated, they compress the fuel located therebetween and force a high pressure jet of fuel through a delivery valve 76 and over a fuel pipe 77 to a fuel nozzle 80 where the fuel is injected as a spray into a cylinder of the engine.

The FIG. 2 schematic includes a showing of a fuel tank 81 from which the fuel is drawn by a transfer pump 84 via a pair of filters 85 and 86. The output pressure from the transfer pump 84 is regulated by a regulator assembly 89. Also, the transfer fuel pressure at the output side of pump 84 goes over a pipe 90 and via a so-called head passage 93 and another conduit or pipe 94 to the inlet port of the metering valve 38. From the outlet port of metering valve 38 the fuel flows via a pipe 97 to a charging passage 98 and from there to the space between the pumping plungers 68 and 69. The amount of fuel that is supplied is determined by the position of the metering valve 38.

In addition to the basic diesel type fuel pump described above, there are some elements added which cooperate with the pump system. Among the elements is the variable stop means 16 that was already mentioned above in connection with the FIG. 1 illustration. It has its plunger 20 that is linearly positioned with reciprocatory movement in a step-by-step manner. It acts as a stop that will be contacted by a tab 101 on the arm 65 of the metering valve 38. In addition, there is the switch 37 that acts in cooperation with the short stud 103 that acts as the pivot of the connecting arm 62, as described above. This switch 37 acts as a zero state indicator for the metering valve 38.

Also, the dump valve 42 that was mentioned above is connected by conduits or pipes 106 and 107 which go between the fuel tank 81 and the pipe 90 that connects to the output of the transfer pump 84. Thus, when the dump valve 42 is open, the transfer pressure will be reduced by opening a return passage to the tank 81.

It may be noted that the system which is described in connection with FIG. 1 includes elements that are part of the whole, such as a battery 110 that supplies the electrical power. And, there is an ignition switch 111 that controls energization of conventional elements such as a starter (not shown), as well as a relay coil 114 which shifts the position of a double pole, double throw switch 113 from the position shown to the other position when the coil 114 is energized. When the switch 113 is shifted, one of the contacts will energize a solenoid 115 of a delayed release switch 118. The other contacts will energize a reduced voltage supply line 119 that goes to the circuit for controlling the solenoid 29 mentioned above. Solenoid 29 acts to position the cam 28. At the same time, a network including resistors 122, 123 and a zener diode 124 provide a regulated lower voltage which may be supplied over a circuit connection 125 to be the source of an appropriate voltage that is used in parts of the microprocessor.

OPERATION

Figure 3B:
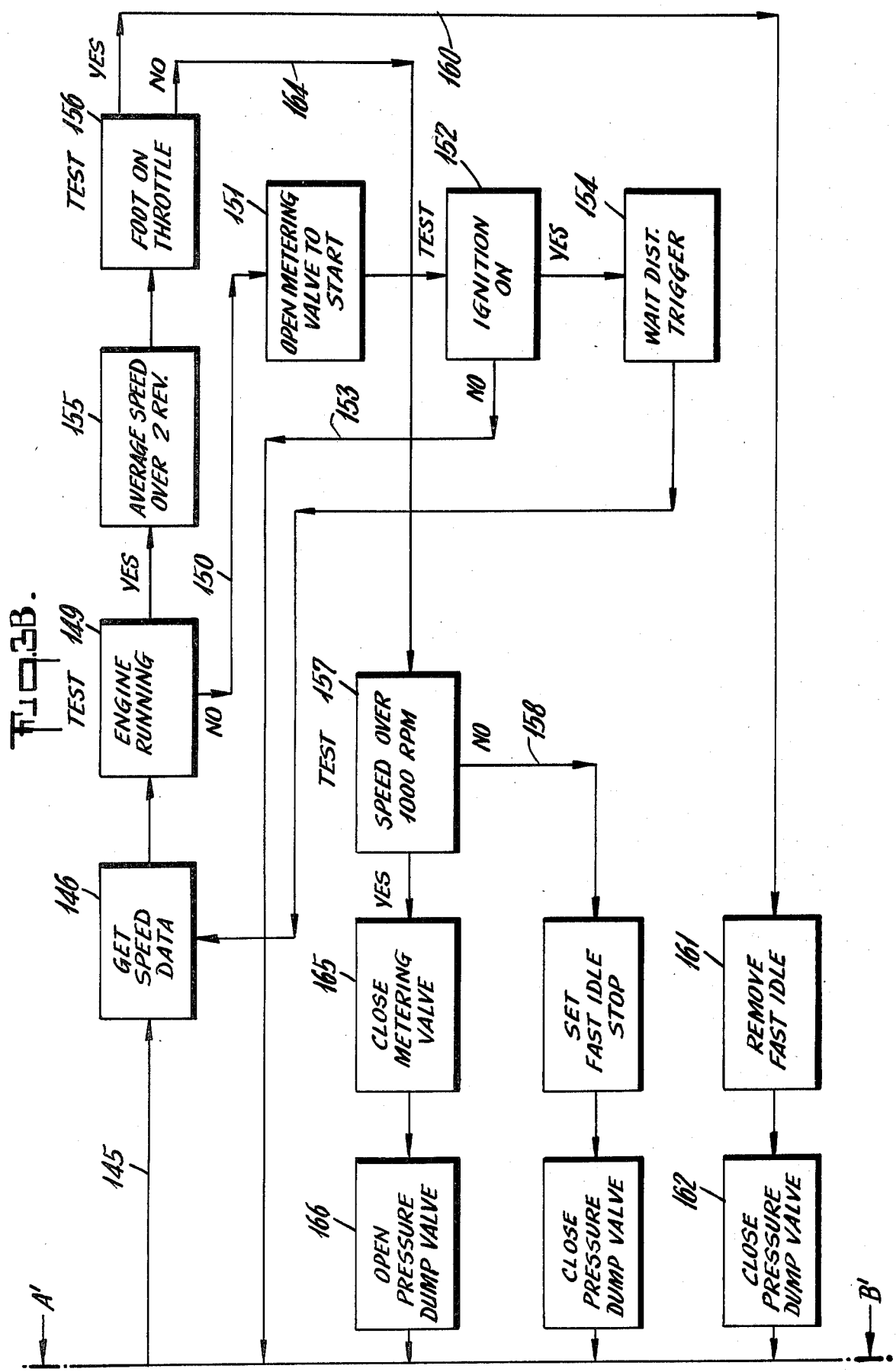

A typical operating sequence of the fuel control system described above, may be followed with reference to the block diagram illustrated in FIGS. 3A and 3B. This diagram shows by captions and arrow connections the flow of information and control signals as the microprocessor acts in connection with the exterior parameters and the internal stored data, both in the read only memory and the random access memory. Thus, the action may be followed beginning at a block 128 in FIG. 3A titled "Ignition Switch On."

Turning on the ignition switch will cause the next step as indicated by a block 129. This includes manual reset of everything as in the microprocessor 11 and includes starting the computer by supplying the required energization when the switch 118 is closed. Also, regulated power is supplied on the low voltage connection 125.

Next, the microprocessor, including both memories, will initiate the action which is indicated by a block 132. This shows the various initial actions as indicated by the captions, i.e. the system is initialized, the random access memory is cleared (indicated by the caption "Clear Scratch Pad"), the input/output ports are set, the fast idle is set, the dump valve is closed, and the stop means (stepping motor) zero is located.

The input/output ports refer to the connections between the microprocessor and the system hardware. These were described above in connection with FIG. 1. For example, there is connection 17 to the stop means 16, the connection 41 to the zero switch 37, the connection 34 to the switch 33 indicating the foot on throttle and connection 30 which goes to the circuit network that controls the fast idle solenoid 29.

Next, the system waits for a signal from the distributor trigger as is indicated by a block 133. This means that the processor then waits for a signal from the speed signal means 21 that is indicated in FIG. 1. As soon as a trigger signal is received, the microprocessor runs through a cycle of testing for various conditions with actions dependent upon the results. This is indicated by the flow of arrows and blocks and the various actions may be followed from the block diagram of FIGS. 3A and 3B.

First, a test is made to determine whether the ignition switch is on or not, as indicated at a block 136. If not, the action goes back as per a flow line 137 and a flow line 138 to a clock 141. Thus, the metering valve 38 is closed, e.g. by actuating a shut-off lever 140 (illustrated in FIG. 2), and after a predetermined time delay as per the design of the switch 118, the power will be switched off to the microprocessor. That is indicated by the caption on a block 142.

If the "ignition switch on" test at block 136 indicates that the ignition switch is on, then the action is as per a flow line 145 and the microprocessor will take internal action to determine the speed as is indicated by the caption on a block 146.

Then, from the speed determination a test indicates whether the engine is running. This is indicated by a block 149. The determination involves measuring the time from receipt of the first distributor trigger signal. And, if it is too long, it indicates the engine is not yet running, but is merely in the cranking mode. Consequently, as the engine is started this test will indicate, "no" and the action will be as per a flow line 150 to a block 151. Thus, the microprocessor will send a signal to cause the metering valve 38 to be opened for starting.

Next, the ignition switch is tested again as indicated at a block 152, to determine whether the ignition switch is still on. If not, the flow of action goes back over a line 153 which joins the line 138 and so again will close the metering valve and shut down the system as per the blocks 141 and 142. However, if the test at block 152 indicates the ignition switch is on, the next step is to wait for a next distributor trigger signal (as indicated by a block 154) and the time measurement will determine the speed, as indicated above.

Then, assuming that the test indicates the engine is running, the speed is averaged over two revolutions, as indicated by a block 155, and a test is made as per block 156 to determine whether an operator's foot is on the throttle. If not, the next test is made as per block 157 to determine whether the speed is over 1000 rpm. If not, the flow of action is over a line 158 and the action is as indicated by the blocks in that path. Thus, the fast idle stop is set and the pressure dump valve is closed. Also, the idle data is obtained from the read only memory while adding any correction factor. Then, a test is made as indicated by a block 159, to determine whether a change of the metering valve setting is needed. If a change is needed, the microprocessor signals a metering valve position change as per a block 170 and the flow of action goes back to the block 133 as indicated by a line 171. Thereafter that same cycle runs again until a correct change has been effected and the test at the block 159 indicates no. When that happens, the action flow goes via a line 173 to a block 174 for an update of any correction factor followed by a return as per a line 176 to run through the cycle again. Under those conditions, the idle speed is correctly maintained until some other parameter of the system is modified so as to remove the engine from idling conditions.

A principal change from idling conditions would be for an operator to put his foot on the throttle. Then, the test at block 156 would indicate yes and the flow of action would go over a line 160 to a block 161 where the action would be to remove the fast idle. Now, the pressure dump valve would close or remain closed, as indicated at a block 162. Next, the run data would be determined from the curve of data points in the read only memory for run conditions. This is indicated at a block 163 (FIG. 3A). Then the system would be in the driving control or run mode, and it would run through similar cycles of the processor to continuously determine whether any change of the metering valve stop is needed.

Under conditions of deceleration, e.g. when the operator has a foot off the throttle, the test at block 156 will indicate no and the information flow will go over the line 164 to the speed test at the block 157. There, if the speed is over 1000 rpm, the next action is to close the metering valve as indicated by a block 165. And, the pressure dump valve will be opened as per a block 166, plus the stepping motor will go to zero, as per a block 167 (FIG. 3A).

It may be noted that in the run mode of the engine operation, fuel delivery is under control of the operator and the system as per this invention is only controlling the position of a mechanical stop which limits the amount that the metering valve can be opened. In this manner the amount of fuel that is delivered each injection is limited to that which can be used by the engine and overfueling and excessive exhaust smoke caused thereby is prevented. It will be understood that pressing on the foot throttle does not directly open the metering valve but only applies compression to a spring that applies added force tending to open it. Consequently, the amount it is opened is under control of the microprocessor in accordance with the invention.

While a particular embodiment of the invention has been described above in considerable detail in accordance with the applicable statutes, this is not to be taken as in any way limiting the invention but merely as being descriptive thereof.

We claim:

1. Fuel control system for an internal combustion engine employing a diesel type fuel injection pump including a pair of pumping plungers actuated simultaneously with radial movement toward one another and having a metering valve, comprising a microprocessor having a read only memory and means for entering a first series of data representing a curve of engine throttle positions for predetermined speeds covering an operating range and a second series of data representing a curve of throttle positions for speeds covering an idling range, incrementally positionable stop means for limiting the opening of said metering valve from zero to maximum, means for connecting said stop means to an output of said microprocessor, speed signal means comprising a pulse generator actuated by said engine, means for connecting said pulse generator to an input of said microprocessor, a random access memory with said microprocessor for temporarily storing data relating to operating parameters of said system, throttle means, means for setting a fast idle state of said throttle means, means for connecting said fast idle state means to an output of said microprocessor, first switch means for determining activation of said throttle, means for connecting said first switch means to an input of said microprocessor, second switch means for sensing zero position of said metering valve, and means for connecting said second switch means to an input of said microprocessor.

2. Fuel control system according to claim 1, wherein said fuel injection pump also has a fuel pressure dump valve, and said system also comprises means for connecting said dump valve to an output of said microprocessor.

3. In an internal combustion engine employing a diesel type fuel injection pump, said pump comprising a drive shaft coupled to said engine, a pair of pumping plungers coupled to said drive shaft, a metering valve for controlling the amount of fuel being delivered to said pumping plungers, and throttle means for controlling said metering valve, the improvement comprising:

incrementally positionable stop means for limiting said metering valve over an operating range, a microprocessor having a read only memory and a random access memory and means for storing tables of data for both the operating and idle speed ranges of said engine, pulse generating means coupled to said engine for providing speed signals therefrom, means for connecting said speed signals to an input of said microprocessor, first switch means for providing a signal when said throttle means is activated, means for connecting said first switch means to an input of said microprocessor, solenoid means for setting a fast idle position into said throttle means, means for connecting said solenoid means to an output of said microprocessor, second switch means for providing a signal when said metering valve is at zero setting, means for connecting said second switch means to an input of said microprocessor, and means for connecting said incremental stop means to an output of said microprocessor for controlling the quantity of fuel injection over the entire range of operation of said engine.

* * * * *